No. 883,874.
PATENTED APR. 7, 1908.
C. GAMBEE.
FLUID MIXER.
APPLICATION FILED APR. 22, 1907.
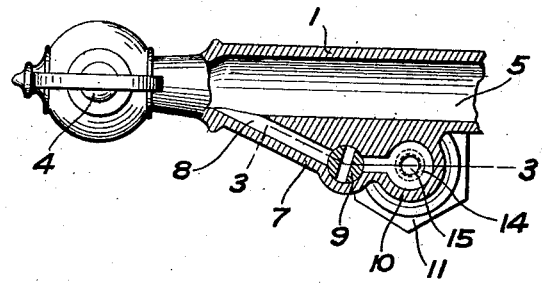
FIG. 2.
FIG. 1.
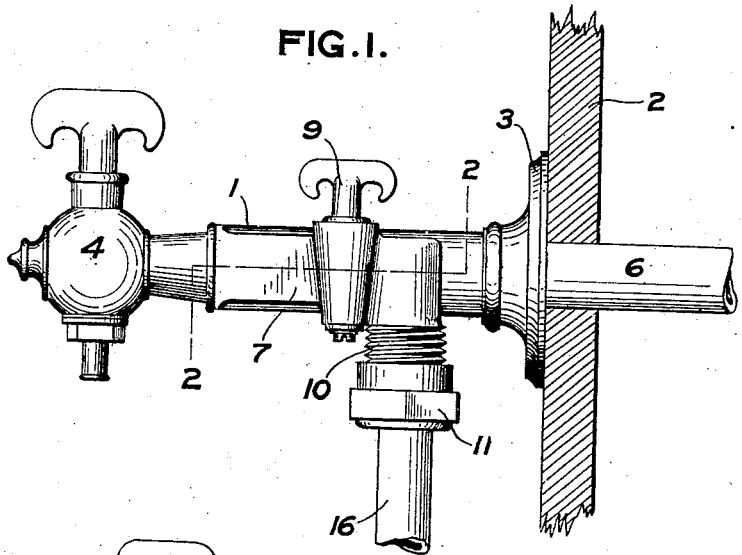
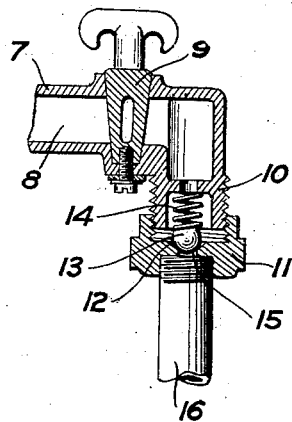
FIG. 3.
WITNESSES:
Clarence W. Carroll
L. Thon
INVENTOR:
Charles Gambee
by Osgood Davis
his attorneys

UNITED STATES PATENT OFFICE.

CHARLES GAMBEE, OF ROCHESTER, NEW YORK.

FLUID-MIXER.

No. 883,874.   Specification of Letters Patent.   Patented April 7, 1908.

Application filed April 22, 1907. Serial No. 369,697.

*To all whom it may concern:*

Be it known that I, CHARLES GAMBEE, a citizen of the United States, and resident of Rochester, in the county of Monroe and State of New York, have invented certain new and useful Improvements in Fluid-Mixers, of which the following is a specification.

This invention relates to fluid mixers, and more particularly to those devices in which the movement of one fluid through a passage draws another fluid into the same passage, somewhat after the manner of an injector. The novel features will be disclosed in the specification and the claims.

In the drawings: Figure 1 is a side elevation of the device; Fig. 2 is a top plan of a section on the line 2—2 of Fig. 1; and Fig. 3 is a vertical section on the line 3—3 of Fig. 2.

The device has a body 1 adapted to be fastened to a suitable support 2 by means of a flange 3. At the outer end of said body is a valve or cock 4, which controls the flow of fluid through the passage 5. This constitutes a faucet of the well known type. The passage 5 is connected through a tube or pipe 6, with a source of supply, such as a barrel or tank, in which fluid is under pressure. This fluid will hereinafter be referred to as fluid A. On one side of the body 1 is formed a projection 7. An auxiliary passage 8 extends therethrough in such a position as to form an acute angle with the axis of the passage 5 (Fig. 2). A cock 9 is placed in the projection 7 to control the flow of liquid through the auxiliary passage 8.

Back of the cock 9 in the projection 7, there is a downturned extension 10, that is threaded on its lower end to receive a nut 11, and communicates with the passage 8. Within said nut is a seat 12, on which rests a ball valve 13, normally held down on said seat by the pressure of a spring 14, and so closing the orifice 15. A tube or pipe 16 is tapped into the bottom of the nut 11, and leads to a source of supply of another fluid (hereinafter referred to as fluid B), which may be under pressure, provided it be less than that of fluid A.

If it is desired to draw liquid A alone, the cock 9 must be closed, as shown in the drawings, and the cock 4 opened. The device will then act as any ordinary faucet, and said liquid A, being under pressure, will flow out while the cock 4 remains open.

If liquids A and B are to be drawn at the same time, and mixed, the cock 9 is opened to the proper degree, which depends upon the proportions in which said liquids are to be mixed. Then the cock 4 is opened, and the rush of liquid A therethrough creates a strong suction in the auxiliary passage 8, which is sufficient to cause liquid B to force the ball 13 upward against the action of the spring 14. Said liquid then flows through the cock 9 and auxiliary passage 8, becoming mixed with the fluid A in the passage 5, and the mixture is discharged through the cock 4.

Upon closing the cock 4, the liquid A tends to back up into the auxiliary passage 8, because its pressure is greater than that of liquid B. But as soon as this happens, the suction upon liquid B being removed, the spring 14 forces the ball 13 to its seat, and closes the orifice 15, thus preventing entrance of liquid A into the pipe 16. The liquids therefore cannot become mixed at any point behind the junction of the passages 5 and 8. The liquid B is generally without pressure, and therefore has no power to lift the ball 13. If the liquid is under pressure, a stiffer spring 14 may be used than otherwise, and an adjustment may be effected to a certain extent by means of the nut 11.

By setting the cock 9 at the predetermined point, which experiment shall have demonstrated is the proper one for drawing the liquids in the proportions desired, the operator will get the desired mixture whenever the cock 4 is opened.

What I claim is:—

1. In a fluid mixer, the combination with a faucet, of a passage controlled thereby that leads to a liquid supply; an auxiliary passage leading from the passage first named, at a point behind said faucet, to another liquid supply; a valve in the auxiliary passage; a spring adapted normally to close said valve against the flow of liquid to the faucet; and an adjustable cock in said auxiliary passage, between said valve and the point of conjunction of said passages; substantially as shown and described.

2. In a fluid mixer, the combination with a faucet, of a passage controlled thereby that leads to a liquid supply; an auxiliary passage leading from the passage first named, at a point behind said faucet, to another liquid supply; a valve in the auxiliary passage adapted normally to close it against the flow of liquid to the faucet; and an adjustable cock in said auxiliary passage between said valve and the point of conjunction of said passages; substantially as shown and described.

CHARLES GAMBEE.

Witnesses:
D. GURNEE,
L. THON.